United States Patent [19]
Yoshizaki

[11] 4,068,261
[45] Jan. 10, 1978

[54] IMAGE PICKUP DEVICES AND IMAGE PICKUP TUBES UTILIZED THEREIN

[75] Inventor: Setsuya Yoshizaki, Kawasaki, Japan

[73] Assignee: Tokyo Shibaura Electric Co., Ltd., Kawasaki, Japan

[21] Appl. No.: 721,504

[22] Filed: Sept. 8, 1976

[30] Foreign Application Priority Data

Sept. 8, 1975 Japan .................... 50-108045
Oct. 6, 1975 Japan .................... 50-119704

[51] Int. Cl.² .................................. H04N 9/04
[52] U.S. Cl. .................................. 358/55; 358/217
[58] Field of Search ............ 358/55, 217, 219, 221; 313/463, 465, 483, 502–509, 498, 358

[56] References Cited
U.S. PATENT DOCUMENTS

| | | | |
|---|---|---|---|
| 2,733,292 | 1/1956 | Cope et al. ............... | 358/217 |
| 2,901,652 | 8/1959 | Fridrich .................. | 313/358 |
| 3,824,004 | 7/1974 | Doi et al. ................ | 358/55 |
| 3,883,768 | 5/1975 | Voinov et al. ............ | 313/483 |

Primary Examiner—Richard Murray
Attorney, Agent, or Firm—Cushman, Darby & Cushman

[57] ABSTRACT

The image pickup device comprises an optical system including an objective lens, light beam spliters such as dichroic mirrors and filters, and image pickup tubes for converting incident light into an electric signal. There is provided at least one transparent bias light source disposed between the objective lens and the light beam spliters or between the light beam spliters and the image pickup tubes and comprising a transparent luminescent layer and a pair of transparent electrode layers for applying operating voltage across the luminescent layer. The bias light source can also be built into the image pickup tube.

16 Claims, 9 Drawing Figures

IMAGE PICKUP DEVICES AND IMAGE PICKUP TUBES UTILIZED THEREIN

This invention relates to an improvement of an image pickup device utilizing bias light method and an image pickup tube utilized in the image pickup device.

An image pickup device generally comprises a lense system including an objective lens, and an image pickup tube for converting a light information of an object transmitting through the lens system into an electrical signal. Especially, in a colour television image pickup device, namely a colour televison camera, in addition to the lens system. A plurality of image pickup tubes and an electric circuits driving the tubes, there are provided a plurality of light beam spliters, that is a plurality of dichroic mirrors and filters of the number associated with the number of the image pickup tubes.

The image pickup tube, for example a vidicon, is liable to produce a lag so that various improvements have been made in the image pickup tube per se, but no satisfactory technique has been made to improve the characteristic in the low brightness region. A bias light method has also been proposed for eliminating the lag of the image pickup tube.

According to the bias light method light having a constant low brightness is impinged upon the image pickup tube from a light source located outside of the information light path. In an image pickup device utilizing the bias light method of spot light source such as an incandescent lamp has been used as the light source, and it is necessary to dispose the light source so as to pass the light through the light path extending through the objective lens and the image pickup tube. According to the prior art construction, however, since it has been impossible to locate the light source on the light path it has been obliged to locate the light source in a different place and to add an optical system including a lens, a correction filter and a half-mirror which are arranged to cause the light emanated by the light source to travel along said light path. For this reason, the prior art image pickup device utilizing the bias light method is disadvantageous in that it is bulky and expensive.

Further, as above described a point light source has been utilized as the bias light source so that it is impossible to cause bias light of uniform brightness to impinge upon the pickup tube even when various correction filters and lens system are used, thus causing a trouble termed "shading" wherein the brightness is not uniform on the target of the pickup tube.

Moreover, since existing image pickup devices are not designed readily to incorporate the bias light sources and the optical systems it is impossible to reconstruct them to adopt the bias light method.

Since the incandescent lamp utilized as the bias light source generates a large quantity of heat the characteristics of other elements of the image pickup device are degraded by the heat.

Accordingly, it is an object of this invention to provide an improved image pickup device and image pickup tube capable of substantially eliminating the lag of the output signal of the image pickup tube to which constant bias light is normally projected.

Another object of this invention is to provide an image pickup device and image pickup tube capable of eliminating the problem of shading or non-uniform brightness of the target caused by non-uniform bias light. Still another object of this invention is to provide a compact image pickup device incorporated with a compact bias light source.

A further object of this invention is to provide an image pickup device incorporated with an exchangeable bias light source that can be readily applied to an existing image pickup device.

According to one aspect of this invention there is provided an image pickup device comprising an image pickup tube including a photoelectric converting section an optical system for projecting the light beam containing the image information of an object upon the image pickup tube, and at least one transparent bias light source arranged between the photoelectric converting section of the image pickup tube and the object on the optical axis of the optical system and the image pickup tube for transmitting the light beam and for superposing thereon uniform bias light.

According to another aspect of this invention there is provided an image pickup tube of the type comprising an envelope containing the electron gun assembly generating an electron beam, a photoelectric converting section disposed in the envelope to receive the electron beam, wherein the image pickup tube further comprises at least one transparent bias light source mounted on the light incident surface of the photoelectric converting section, and the bias light source transmits a light beam containing the image information of an object and superposes uniform bias light upon the light beam.

This invention can be more fully understood from the following detailed description when taken in conjunction with the accompanying drawings, in which.

Figure 1:
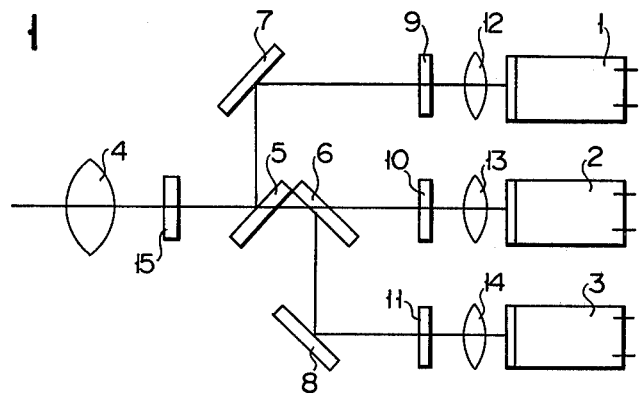
FIG. 1 is a diagrammatic representation of one embodiment of the image pickup device embodying the invention.

A preferred embodiment of the image pickup device utilizing the bias light method of this invention shown in FIG. 1 represents a colour television camera including three image pickup tubes 1, 2 and 3 converting into electric signals light beams containing an information of an object and split into three primary colours. The light from the object containing the informations thereof passes through objective or field lens 4 and is then split into three primary colours, that is red, green and blue colours by a light beam split for example dichroic mirrors 5 and 6. The split lights then impinge upon the image pickup tubes 1, 2 and 3, respectively. More particularly, the red component of the light transmitting through the field lens 4 is reflected upwardly by the red light reflecting dichroic mirror 5 while the green and blue components transmit through this mirror 5. The blue component is reflected downwardly by the flue light reflecting dichroic mirror 6 while the green component transmits through the mirror 6 to reach image pickup tube 2. The red and blue components reflected by dichroic mirrors 5 and 6 are reflected by reflecting mirrors 7 and 8 to reach image pickup tubes 1 and 3 respectively. The red, green and blue components split by the dichroic mirrors 5 and 6 transmit through colour correction filters 9, 10 and 11 and camera lenses 12, 13 and 14 respectively before entering into the respective image pickup tubes 1, 2 and 3.

According to this invention, the light bias method is adopted so that a transparent bias light source 15 is arranged between the field lens 4 and the dichroic mirror 5. The light emanated by the bias light source is project upon respective image pickup tubes 1, 2 and 3 together with the light components containing the light information of the object. As will be described later, since the bias light source 15 comprises a flat or plain light source emanating light of uniform and constant intensity at the time of operating the image pickup device so that uniform bias light impinges upon respective image pickup tubes thereby eliminating the lag on their targets.

Figure 2A:
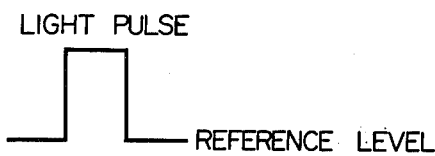
FIGS. 2A and 2C show the waveforms of light pulses impinging upon the target of an image pickup tube.
Figure 2B:
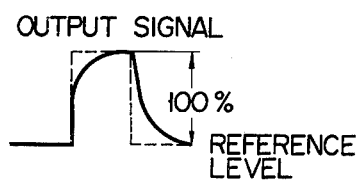
FIGS. 2B and 2D show the waveforms of the output signals produced by the image pickup tube in response to the light pulses shown in FIGS. 2A and 2C; which are useful to explain the elimination of the lag caused by the adoption of the bias light method.

As has been pointed out before, according to the bias light method, light of uniform and low intensity is normally projected upon a target of an image pickup tube from a light source located on the outside of the information light path. The detail thereof will now be described with reference to the accompanying drawings.

suppose now that a constant light pulse as shown in FIG. 2A is projected upon an image pickup tube, a vidicon for example. In response to this light pulse, the tube produces an output signal having a waveform as shown in FIG. 2B, which shows that the output signal delays from the input light pulse not only at the build up time but also at the decay time. Such delay of response causes so-called lag thus degrading the quality of the reproduced image.

Such lag involves a capacitive lag caused by the volume, the dielectric constant and the proper resistance of the photoconductive layer of the target and a photoconductive residual image caused by the behavior of the electrons is the photoconductive layer. The delay of the output can not be sufficiently eliminated by the improvement of the construction of the target, and can be substantially eliminated only by the bias light method.

Figure 2C:
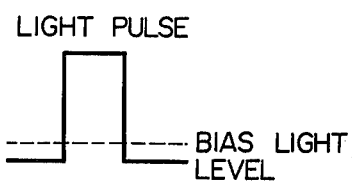
Figure 2D:
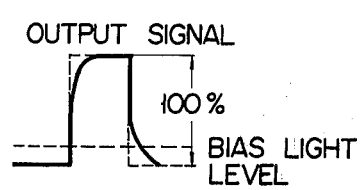
Figure 3:
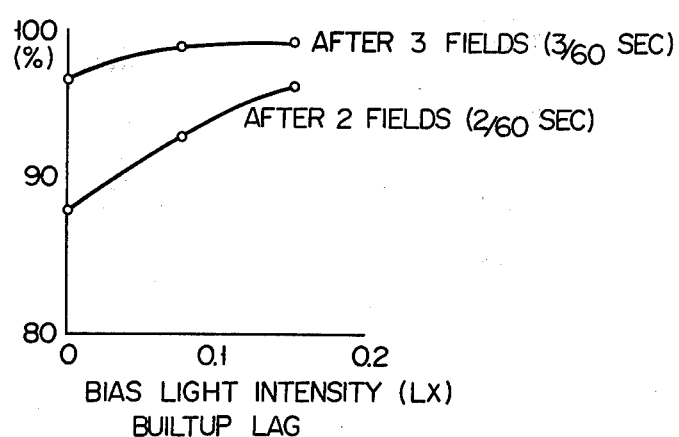
FIGS. 3 and 4 are graphs showing the built up lag characteristic and the decay lag characteristic respectively with respect to the bias light intensity.
Figure 4:
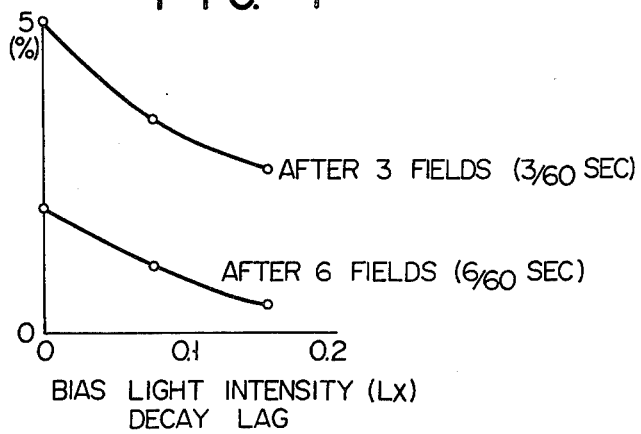

Thus, when the bias light is projected upon the target of the image pickup tube and a light pulse as shown in FIG. 2C is projected upon the target, the output signal will have a waveform as shown in FIG. 2D. By comparing FIG. 2B and 2D it can be clearly noted that in the case of FIG. 2D, the time delay of build up, namely the build up lag and the time delay of decay, namely the decay lag are both improved. Where a chalcogenide type photoconductor, for example, cadmium celenide is used to form the photoconductive layer of the target, as can be noted from the build up lag characerstics shown in FIG. 3 and the decay lag characteristics shown in FIG. 4, the both lag characteristics are improved greatly even at an small intensity of the bias light of only 0.1 lux represented by the abscissa.

Usually the output signal caused by the bias light is set to be sufficiently smaller for example, less than one-tenth, than the output signal caused by the light pulse.

The build up and decay lags are improved by the bias light on the ground that a constant signal current flows through the photoconductive layer of the target, in other words the resistance of the photoconductive layer decreases and the surface voltage of the photoconductive layer increases corresponding to the resistance of that.

One example of a transparent bias light source 15 utilized in the image pickup device will now be described with reference to FIG. 5.

Figure 5:
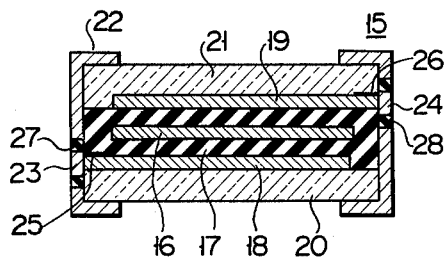
FIG. 5 is a diagrammatic sectional view of one example of a bias light source utilized in the image pickup device of this invention.

The bias light source 15 shown in FIG. 5 is an element utilizing electroluminescence and comprising a flat sheet shaped transparent luminescent layer 16, a transparent insulative layer 17 embedding the luminescent layer 16 and having a high dielectric constant, a high resistance and a small leakage current, and a pair of transparent electroconductive layers or electrodes 18 and 19 on the opposite sides of the insulative layer 17. A transparent glass substrate 20 is provided to support layers 16 through 19. There are also provided a transparent protective layer 21 covering the electrode 19 and a cover 22 covering the side surfaces of the bias light source for protecting and reinforcing the same and for preventing the leakage of the light in the lateral direction.

The bias light source 15 is manufactured as follows.

At first the first transparent electrode 18 including indium oxide or tin oxide is deposited on the transparent glass substrate 20 by vacuum deposition, blasting or sputtering technique. Then the luminescent layer 16 and the insulative layer 17 including of aluminum oxide, yttrium oxide or silicon nitride are deposited on the electrode layer 18 such that the luminescent layer 16 is completely surrounded by the insulative layer 17. The luminescent layer 16 is made of a zinc sulfide incorporated with a little fluoride of a rare earth metal, or manganese of less than several per cent by weight. The luminescent layer 16 can be covered by the insulative layer 17, that is, the insulative layer is deposited onto the electrode 18 and non-deposited surface of the glass substrate, then vapour depositing the luminescent layer 16 is deposited on a smaller area than the first insulative layer by using a suitable mask and again the insulative layer is deposited onto an area larger than the luminescent layer 16.

Then the second electrode 19 is deposited on the insulative layer 17 by the same method as the first electrode 18. Thereafter, the protective layer 21 made of transparent glass or resin is applied on the second electrode 19. Finally, the cover 22 is applied to integrally hold the assembly of various layers 18, 19, 20 and 21.

Terminals 23 and 24 adapted to connect the first and second transparent electrodes 18 and 19 respectively with an external circuit are connected through conductive silver paste layers 25 and 26 applied onto the end portions of the electrodes. The terminals 23 and 24 are embedded at the center of annular insulating embedding members 27 and 28 respectively which are secured to the opening bored through the side walls of the cover 22.

When a suitable DC or AC voltage is applied across terminals 23 and 24 the luminescent layer 16 is caused to luminesce by the electric field created between the first and second electrodes. In the example described above although the luminescent layer 16 is embedded in the insulative layer 17, this is not always necessary. For example, the luminescent layer may be sandwiched between two insulative layers, although humidity-free property and life degrade more or less. With the former construction it is possible to limit the leakage current to an extremely small value so that the Joule heat caused by the leakage current can be minimized. Further, it is possible to protect favorably the luminescent layer against surrounding atmosphere. In the example shown, it is easy to make the thickness between two electrodes to be about one micron so that it is easy to make the entire thickness of the light source to be less than 2mm. For this reason, it is possible to locate the thin sheet shaped bias light source at any position along the light path, for example, between the field lens 4 and the dichroic mirror 5, or in front of respective correction filters 9, 10 and 11. Since the total thickness of the source is extremely thin, less than 2mm for example, it is easy to incorporate such light source into existing image pickup devices not provided with the bias light sources. It is also easy to construct the transparent bias light source 15 to have a percentage of light transmissivity of more than 70% so that insertion thereof in the light path of the light containing the light informations of the object does not decrease the quantity of light transmitted toward respective image pickup tubes.

The area of the light receiving surface of the bias light source 15, namely protective layer 21 or the glass substrate 20 is required to be sufficiently large enough to receive all incident light. This is especially important for the luminescent layer 16 because it is necessary for the luminescent layer 16 to pass all incident light. In order to prevent reflection or dispersion of the light at the incident surface and the light emitting surface of the bias light source these surfaces are optically flat and arranged in parallel each other and perpendicular angles to the optical axis of the incident light.

Figure 6:
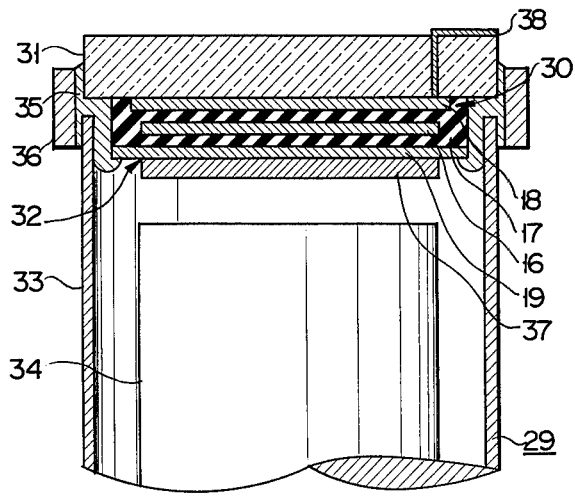
FIG. 6 is a diagrammatic sectional view of a modified image pickup tube of this invention.

FIG. 6 shows a modified embodiment of this invention wherein a transparent bias light source 30 is built in an image pickup tube 29 without substantially increasing its size. The bias light source 30 has substantially the same construction as the bias light source 15 shown in FIG. 5, except that the face plate 31 of the image pickup tube 29 is used as the glass substrate of the bias light source and that the transparent second electrode 19 is also used as the signal plate of the target 32. More particularly, the image pickup tube 29 shown in FIG. 6 is of the vidicon type and comprises a cylindrical glass envelope 33 and an internal electrode structure 34 such as a grid electrode, etc. The cylindrical glass envelope 33 and the face plate 31 are secured to a metal ring 36 in an air tight fashion thus forming an air tight evacuated envelope. An indium layer 35 formed on the inner side of the metal ring 36 is pressed inwardly along the inner surface of the cylindrical glass envelope 33 when the target electrode 32 is disposed in the glass envelope 33, thereby securing together the face plate 31 and the cylindrical glass envelope 33 into an integral structure. Usually, the indium extends into the inner surface of the envelope 33 to form a ring between the envelope 33 and the outer edge of the light source 30 about 0.2 to 0.5 mm in height, and is caused to contact the signal plate 32 of the target thus forming a low resistance contact for the output signal. On the inner surface of the face plate 31 are laminated the bias light source 30 comprising the first and second transparent electrodes 18 and 19, the transparent insulative layer 17 and a transparent luminescent layer 16 and the target plate 32 comprising the second transparent electrode 19 of the photoconductive layer 37. The bias light source 30 comprises the first transparent electrode 18 deposited on the inner surface of the face plate 31, a transparent luminescent layer 16 covered with transparent insulative layer 17 and the second transparent electrode 19 which also acts as the signal plate of the target 32 which comprises a photoconductive layer 37 formed on the second electrode 19.

Respective elements of the bias light source 30 are made of materials already described. Instead of lead out terminals 23 and 24 shown in FIG. 5 thin ribbon shaped platinum wire 38 and indium layer 35 are used. The platinum wire 38 is embedded in one end of the face plate 31 to extent through thereof and electrically connected to the first transparent electrode. Accordingly, when a suitable DC or AC voltage is applied across the platinum wire 38 and the metal ring 36 an electric field is formed between the first and second electrode 18 and 19 to cause the luminescent layer 16 to emanate desired bias light.

The uniform bias light emanated by the luminescent layer 16 and the light containing the image information of the object and transmitting through the face plate 31 and the transparent bias light source 30 form a charge-image on the photoconductive layer 37 corresponding to the tone of the object. Thus charge-image is discharged by scanning the target with electron beam emitted from an electron gun, not shown, of the pickup tube 29, accelerated by inner electrode structure including a grid electrode, focussed and deflected by magnetic field, thereby producing an output signal which is derived out through indium layer 35 and the metal ring 36.

The signal thus produced does not form any lag because the bias light source is built into the image pickup tube. Since the thickness of the bias light source is extremely thin as above described, the image pickup tube having the thin bias light source can be readily incorporated into image pickup device. Moreover, as the total thickness of the bias light source is about 1.0$\mu$ it is easy to construct it to have high percentage of light transmission of more than 70% thus efficiently transmitting the light consisting the image information of the object.

According to the embodiment shown in FIG. 6 the bias light source 30 is incorporated in an image pickup tube per se instead of arranging it in an optical system. In this case, the image pickup tube is so improved as to permit the bias light source 30 to be properly incorporated therein. That is, a pickup tube of an image pickup device free from a bias light source is replaced by the bias light source-equipped-pickup tube and a power source for bias light is taken out from a circuit in the image pickup device, thereby offering an improved image pickup device. Further, instead of mounting on the inner side of the face place it is also possible to mount the bias light source on the outside of the face plate in this case it is necessary to cover the transparent electrode of the bias light source with a transparent protective layer just in the same manner as the embodiment of FIG. 5.

Although in the foregoing description, the luminescent layer 16 was composed of an electroluminescent material it is obvious that any other transparent flat light source can also be used.

As mentioned above, according to this invention the flat light source is used instead of a point light source, providing uniformed illumination without involving "shading". Furthermore, since the light source is not of heat generating type, the elements undergo no undesirable change in properties due to a thermal influence from the light source. The image pickup device and thus the image pickup tube can be also made compact, since the light source is very thin.

What is claimed is:

1. An imggge pickup device comprising at least one image pickup tube including a photoelectric converting section, an optical system for projecting the light beam containing the image information of an object upon said image pickup tube and at least one transparent bias light source arranged between the photoelectric converting section of said image pickup tube and said object on the optical axis of said optical system and said image pickup tube for transmitting said light beam and for superposing thereon uniform bias light.

2. An image pickup device according to claim 1 wherein said bias light source is disposed on the optical axis of said optical system.

3. An image pickup device according to claim 1 wherein said bias light source is mounted in front of the photoelectric converting section of said image pickup tube.

4. An image pickup device according to claim 3 wherein said image pickup tube comprises an envelope containing the electron gun assembly generating an electron beam and a photoelectric converting section arranged to receive said electron beam and a bias light source mounted on said photoelectric converting section.

5. An image pickup device according to claim 4 wherein said bias light source takes the form of a thin flat sheet including a flat transparent luminescent layer composed of electroluminescent material, a transparent insulator layer embedding said luminescent layer, and a pair of transparent electrode layers formed on the opposite surfaces of said insulator layer for applying a voltage across said luminescent layer through said insulator layer, said photoelectric converting section being laminated on said layers of the bias light source and one of said electrode layers contiguous to said photoelectric converting section receiving electric charge therefrom thus acting as the signal plate of said image pickup tube.

6. An image pickup device according to claim 4 wherein said image pickup tube further comprises a signal plate composed of a transparent conductive layer which is formed on the light incident surface of said photoelectric converting section for receiving electric charge therefrom and a face plate mounted on the light incident surface of said signal plate, and wherein said bias light source is mounted on said face plate, said bias light source comprising a flat transparent luminescent layer composed of electroluminescent material, a transparent insulator embedding said luminescent layer and a pair of transparent electrode layers formed on the opposite outer-surface of said insulator for applying a voltage across said luminescent layer through said insulator.

7. An image pickup device according to claim 4 wherein said image pickup tube comprises a vidicon.

8. The image pickup device according to claim 1 wherein said bias light source comprises a plain light source having a flat and transparent luminescent layer.

9. An image pickup device according to claim 8 wherein said plain bias light source comprises a pair of transparent insulative layers, a flat and transparent layer composed of electroluminescent material and sandwiched between said insulative layers, and a pair of transparent electrode layers on the outersurface of said insulative layers for applying voltage across said luminescent layer through said insulative layers.

10. An image pickup device according to claim 8 wherein said plain bias light source comprises a flat and transparent luminescent layer composed of electroluminescent material.

11. An image pickup device according to claim 1 wherein said optical system comprises at least one light beam spliter for splitting said light beam containing the image information of the object into a plurality of different light components and said image pickup tubes are provided at a number associated with the number of said light components and a single bias light source is disposed in front of said light beam spliter on the optical axis thereof.

12. An image pickup device according to claim 1 wherein said optical system comprises a light beam spliter for splitting the light beam containing the image information of the object into a plurality of light components, and said device further comprises a plurality of image pickup tubes of the number equal to the number of said split light components and a plurality of bias light sources respectively disposed between said light beam spliters and respective image pickup tubes on the optical axes thereof.

13. In an image pickup tube of the type including an envelope containing the electron gun assembly generating an electron beam, and a photoelectric converting section disposed in said envelope to receive said electron beam, the improvement wherein said image pickup tube further comprises at least one transparent bias light source mounted on the light incident surface of said photoelectric converting section, and said bias light source transmits a light beam containing the image information of an object and superposes uniform bias light upon said light beam.

14. An image pickup tube according to claim 13 wherein said bias light source takes the form of a thin flat sheet which comprises a flat transparent luminescent layer composed of electroluminescent material, a transparent insulator layer embedding said luminescent layer, and a pair of transparent electrode layers formed on the opposite outer surfaces of said insulator layer for applying a voltage across said luminescent layer through said insulator layer, said photoelectric converting section formed on the layers of said bias light source being successively, and one of said electrode layers contiguous to said photoelectric converting section acting as a signal plate of the image pickup tube for receiving electric charge therefrom.

15. An image pickup tube according to claim 13 wherein said image pickup tube further comprises a signal plate composed of a transparent electroconductive layer mounted on the light incident surface of said photoconductive section to receive electric charge therefrom, and a face plate provided on the light incident surface of said signal plate, and wherein said bias light source comprises a flat transparent luminescent layer composed of electroluminescent material, a transparent insulator layer embedding said luminescent layer, and a pair of transparent electrode layers formed on the opposite surface of said insulator layer for applying a voltage across said luminescent layer through said insulator layer, the respective layers of said bias light source being successively formed on said face plate whereby said bias light source is integrally mounted on the light incident surface of said photoelectric converting section through said signal plate and said face plate.

16. An image pickup tube according to claim 13 which is a vidicon.

* * * * *